INVENTORS
KJELL MOSWOLL JAKOBSEN
HANS-IVAR ERIKSSON

INVENTORS
KJELL MOSWOLL JAKOBSEN
HANS-IVAR ERIKSSON
BY
Hane and Nydick
ATTORNEYS INVENTORS
KJELL MOSWOLL JAKOBSEN
HANS-IVAR ERIKSSON
BY
Hane and Nydick
ATTORNEYS INVENTORS
KJELL MOSWOLL JAKOBSEN
HANS-IVAR ERIKSSON
BY Howe and Nydirk
ATTORNEYS United States Patent Office 3,671,386
Patented June 20, 1972

3,671,386
PRODUCING TUBULAR MEMBERS OF LIGNO-
CELLULOSE MATERIAL BY COMPRESSION
WITHIN AN ANNULAR CHAMBER
Kjell Moswoll Jakobsen, Ronninge, and Hans-Ivar
Eriksson, Malmo, Sweden, assignors to Aktiebolaget
Platmanufaktur, Malmo, Sweden
Filed Dec. 3, 1969, Ser. No. 881,816
Claims priority, application Sweden, Dec. 4, 1968,
16,549/68
Int. Cl. D21j 3/04
U.S. Cl. 162—224                         15 Claims

ABSTRACT OF THE DISCLOSURE

A method and apparatus for making tubular members wherein a slurry of a liquid and a lignocellulose material is reciprocatingly compressed in a vertically aligned dewatering chamber of annular cross-section. The compression takes place in a vertical direction and the drainage openings are angled such that the extracted liquid does not repass through the tubular member being formed. The tubular product is then placed in a mould where it undergoes radial compression at a pressure of from 10 to 100 atmospheres and is heated to a temperature of 50 to 250° C. to thermoset the lignocellulose material.

The present invention relates to a method of producing elongated, particularly tubular members of mainly lignocellulose containing fiber material and a device for carrying out the procedure.

The invention particularly relates to a method of producing tubular members of lignocellulose material with a high compression strength, which are suitable for the manufacture of pressure-resisting containers, such as beer cans. When making such containers it has hitherto been necessary to use combinations of pasteboard or paper and plastic or plastic only, which materials have had serious disadvantages as regards strength and production economy.

The present invention eliminates disadvantages.

The method according to the invention is characterized in that a lignocellulose material in the form of a water suspension is inserted in a first dewatering chamber and is dewatered mainly radially through openings in the walls of the chamber to form a coherent form member with a dry substance content of at least 15% by being subjected to axial compression, after which the form member obtained is dewatered in one or several further stages to the final, desired moisture content, particularly through radial compression. By dewatering the fiber suspension in this way through compression in two directions parallel layers of material which result in a low strength product are prevented from forming the fibers. Instead, the fibers are felted together in at least two different planes giving the dewatered product good strength in all directions.

Depending upon the degree of high strength which is desired in the finished product, the final dewatering can be carried out to varying high degrees. Thus, the elongated or tubular member obtained according to the above-mentioned procedure can be used directly after one single compression with subsequent drying for insulation purposes or the like. If higher strength is desired, further dewatering is carried out through one or several subsequent compressions, which can possibly be carried out in conjunction with heating. This additional pressing takes place radially, i.e. at right angles to the longitudinal direction of the form member, whereby the desired strength is obtained. Pressing is then carried out to such an extent that the form member is compressed to least 40% of its original thickness. Through this operation the strength in the longitudinal direction of the form member is increased to a particularly high degree. When there are particularly severe requirements for high compressive strength of the product, for instance when it is to be used for manufacturing beer cans, the pressing is carried out at an elevated temperature so that the thermoplastic components of the lignocelloluse material are liquified and irreversibly chemically transformed to serve as a natural, reinforcing bonding agent. The heating, which can take place during or after the pressing, but should preferably take place during the pressing, is carried to a temperature of 50-250° C. Appropriate pressing pressures are 10-100 atm, and particularly 40-60 atm. Naturally, if deemed advisable, such pressing can be carried out in several stages. During the pressing operation, it is advantageous if the surfaces against which the form member is pressed are smooth, and preferably highly polished, whereby the surface of the finished product will obtain the smoothness desired. During both the first compression and any subsequent compressions, it is essential that formation of blisters of steam or air enclosed in the fiber material is avoided.

One of the great advantages of the method according to the invention is that no extra bonding agent need be added to the material with its content of lignocellulose. On the other hand, under certain circumstances, it can be appropriate to add small quantities of some bonding agent to the fiber suspension in order to obtain special effects. Particularly suitable bonding agents in such cases are melamine resins and polyvinyl alcohol.

Appropriate prime materials for the production of tubular members according to the invention are fiber suspensions such as bleached and unbleached paper pulps, produced according to the sulphite or sulphate methods. Also mechanical pulps, such as spruce pulp can be used. A particularly suitable material is so-called Asplund Pulp, i.e. a board base pulp produced through defibration of, for instance, unpeeled sawmill chips from approx. 50% spruce and pine and 20% bark-free frame sawdust in an Asplund defibrator, owing to the high content of lignin and resin in this pulp.

The radial dewatering applied in the present invention is of the utmost importance to the method according to the present invention, as the fiber suspension, which should have a dry content of 1–6% from the beginning, must be subjected to a very heavy and rapid dewatering in the first dewatering stage if the method is to be utilized economically in an automatically functioning machine. The dry content should then be raised to at least 15%, and preferably 30%. Appropriate radial dewatering is accomplished by providing the mould walls of the dewatering apparatus with small holes, or longitudinally arranged radial slots, made in such a way that they facilitate the dewatering and do not become clogged by fibers.

The method according to the present invention will be more fully understood from the following detailed description of the procedure and of a device for carrying out the procedure with reference to the accompanying drawings, in which:

FIG. 5 shows a section through a second dewatering and moulding chamber; and in which

In the method according to the present invention the initial material consists of lignocellulose material in a suspension enclosed in a container 1 of some arbitrary form. The suspension, which has a dry content of 1–30%, particularly 1–6%, is stirred in the container in order to avoid sedimentation and in order to obtain an even distribution of the cellulose material.

In the procedure, the suspension is preferably conveyed in a first step to a collection chamber. From this chamber the suspension is picked up in a second step by e.g. a plunger and is conveyed into a dewatering chamber. In a third step the suspension is compressed in the dewatering chamber, the dewatering then taking place through appropriate openings in the walls of the chamber. The compression can then, for instance, be achieved by designing the chamber so that its cross-section area is gradually reduced to the desired dimension of the dewatered member. In the procedure, continuous picking up and compression of the suspension can be accomplished by giving the plunger a continuous reciprocating movement in the chamber. When a certain quantity of suspension has been compressed and dewatered in the dewatering chamber so that a coherently formed member has been obtained, a desired length of same is cut-off in a fourth step. The cut-off part is thereafter conveyed by means of some appropriate device over a second dewatering station. In a fifth step, further dewatering takes place and possibly simultaneous shaping of the part to the desired form and water content through compression in a radial direction.

In order to facilitate the dewatering, the suspension can be heated to approx. 70° C. The dewatering stations can also be heated, for more rapid dewatering. Thus, the second dewatering station can operate at temperatures of up to approx. 250° C.

It is obvious that, for certain products, dewatering can take place in one single dewatering station, while for other products, when there are requirements for greater strength, dewatering in one or several more stations can be required.

Picking up of the suspension and compression and dewatering of it to the desired formed product can also take place through compression in one single step.

In the following, a device for carrying out the method in accordance with the invention will be described with the aid of an example.

Figure 1:
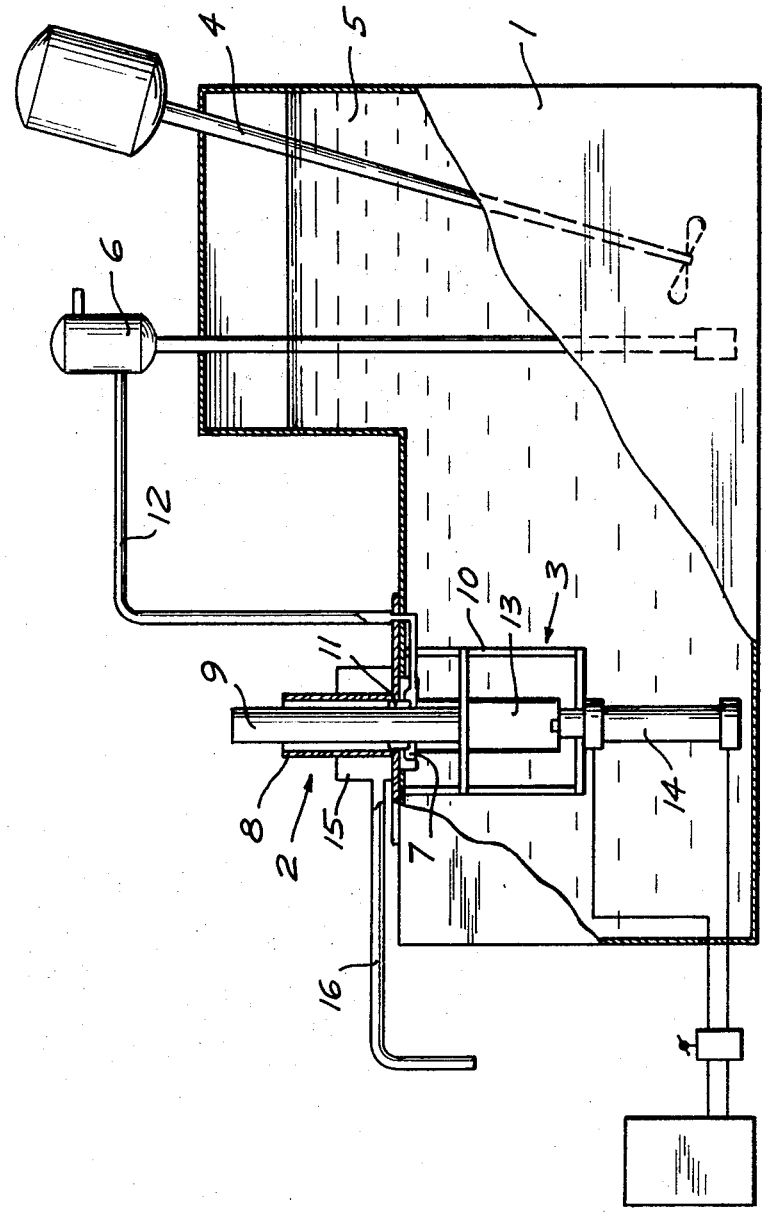
FIG. 1 shows a cross-section through a device for producing tubular members of lignocellulose material according to the invention.

With reference to FIG. 1, a device is shown therein which comprises a container 1 for suspension, a forming and dewatering chamber, shown as one unit with the reference designation 2, and a feeding and compression device, shown as a unit with the reference designation 3.

Figure 2:
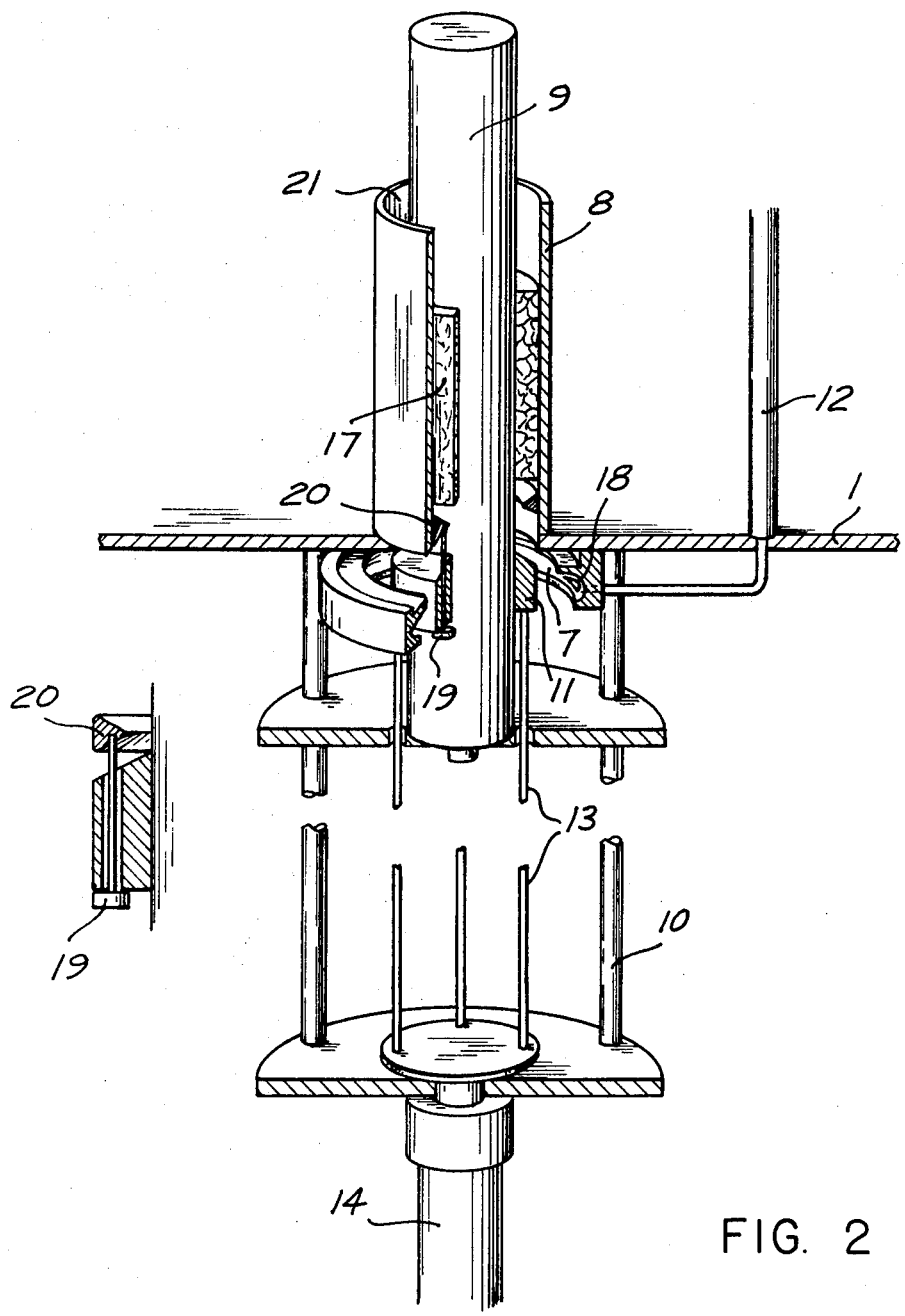
FIG. 2 shows a section through the lower part of a dewatering chamber with plunger and non-return valve.
Figure 3:
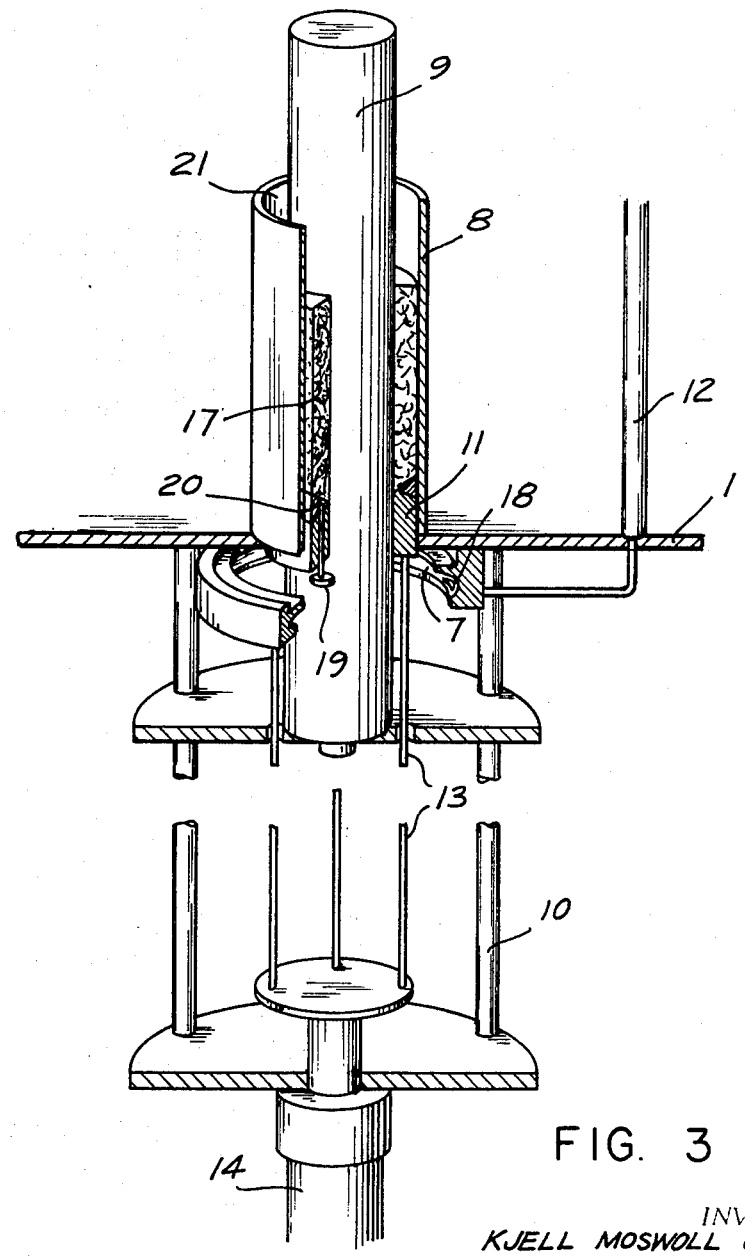
FIG. 3 shows a section similar to the section according to FIG. 2 but in which the plunger and non-return valve are in an upper working position.

The container 1 can be designed in any suitable way. It is provided with a stirrer 4 for the suspension 5, in order to maintain the homogeneity of the suspension and in order to prevent sedimentation. The container can also be provided with heating devices not shown. In the example of the embodiment shown in FIG. 1, the device is intended for producing a formed member through compression and dewatering in a direction upwards from the container 1. Even if another feeding direction is possible, the embodiment shown and described is preferable, since the water is then drained in a direction away from the produced formed member. In the device herein described the container 1 is also provided with a pump 6, which pumps the suspension to a ring-formed chamber 7, connected with the lowermost part of the dewatering chamber. The intake 18 (see FIG. 2) in the chamber 7 is then arranged in such a way that the suspension is forced to flow into the chamber tangentially, whereby a forceful rotating movement is obtained, ensuring a uniform suspension in the dewatering chamber. The ring-formed chamber 7 is located in such a way that it is entirely under the level of the liquid in the container 1. The ring-formed chamber is arranged immediately in connection with a wall of the container, on the outside of which and concentrically with said chamber 7 a dewatering chamber 8, 9 is arranged. This chamber comprises an outer tube 8, which has a sealing connection to the container, is provided with a corresponding opening with a diameter substantially the same as the inside diameter of the tube. Tube 8 which constitutes the outer wall of the dewatering chamber is provided with dewatering openings not shown, which can have the form of a number of radial through holes or slots, arranged along the tube. The holes can be distributed in a spiral along the tube, and the slots can also have a spiral form. Centrally in the outer tube 8, a mandrel or an inner tube 9 is arranged, which extends somewhat outside the outer tube 8 in one direction and also through said opening in the container and through the ring-formed chamber to a bracket 10, fastened in the container. Preferably a central tube is used, which is provided with dewatering openings like the tube 8, and is used as a drain member during the dewatering, and the bracket can then be designed as a drain channel for water. In the ring-formed space between the outer tube 8 and the inner tube 9 a plunger 11 is arranged. In its starting position the plunger is a certain distance below the liquid level in the ring-formed chamber 7. Above the plunger a non-return valve 20 is arranged, which is best shown in FIG. 2 or 3. The plunger 11 is connected by means of rods 13 with a driving device, in this case a hydraulic cylinder 14 with a reciprocating working piston. The driving device can, for instance, be fastened to the previously mentioned bracket 10 or directly to the container 1. Enclosing the part of the outer tube 8, which is located beside the container 1, a collection chamber 15 is arranged for collection of the liquid pressed out during the compression operation.

In order to obtain a sufficient first compression and dewatering a certain length of the inner and outer tubes 8, 9 is required. This length can be made relatively short by forming the tubes in such a way that the ring-formed area between the tubes is allowed to decrease successively as the distance from the feeding end increases.

FIGS. 2 and 3 show the intake end of the dewatering chamber. The plunger 11 is shown in FIG. 2 in a lowered starting position and in FIG. 3 in a raised working position. The plunger 11 is ring-formed and adapted for insertion in the ring-formed space between the outer tube 8 and the inner tube 9. At its lower end the plunger 11 is fastened to driving rods as previously described, which coact with a piston in the hydraulic driving device 14 (FIG. 1). At its upper end, in the starting position, the plunger forms a slot which constitutes a connecting opening between the dewatering chamber 21 and the suspension in the container. A non-return valve 20 is connected movably axially to the plunger 11 through one or several rods 19. Through the movable connection the valve assumes an open position when the plunger is in the position according to FIG. 2, and a closed position when the plunger is in the position according to FIG. 3. The inlet opening 18 of the ring-formed chamber 7 is connected with the pump, as previously described.

Figure 4:
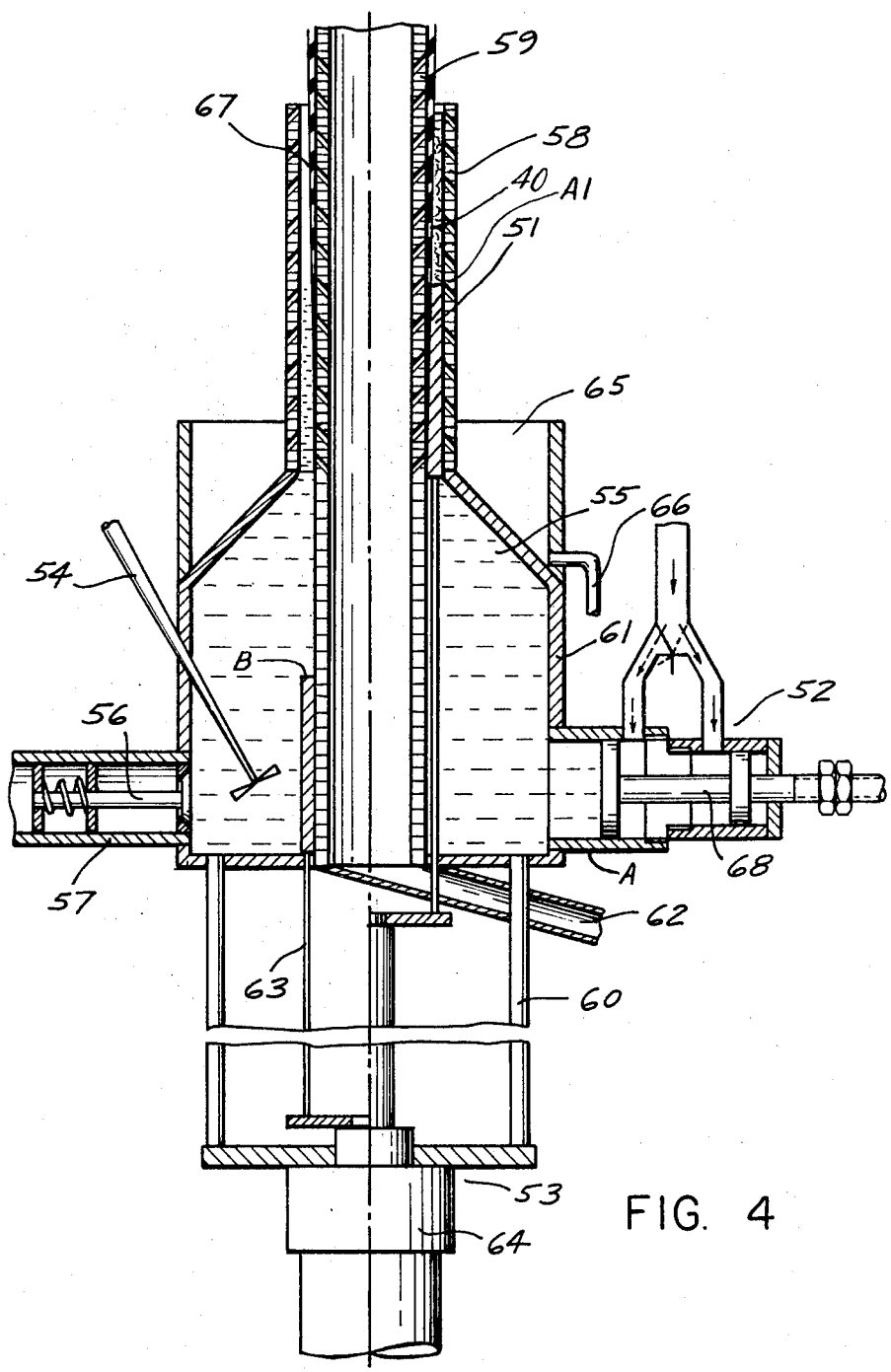
FIG. 4 shows a modified form of the device according to FIG. 1.

In FIG. 4 a somewhat modified version of the device according to the invention is shown. The modified version should not require any detailed description, as it is easily understood from the information given above with reference to FIG. 1. However, it should be noted that the device shown here is designed in such a way that one single working stroke of the plunger 51 will compress and dewater the suspension into a fibrous product with a dry content of at least 15%. The length of stroke is adapted so that the formed member will have the full length for the purpose intended, e.g. 150 mm. for further dewatering and shaping into a can body 40 (see FIG. 6). In a device of this type, no non-return valve 20 is required, which on the other hand is necessary in the device according to FIG.

1 in order to obtain efficient function. In the modified device according to FIG. 4, however, the suspension is fed to the dewatering chamber under a certain pressure on the liquid, in order to ensure that a sufficient quantity of the suspension to form the formed member is conveyed into the dewatering chamber before the compression, the pressure being between 1 and 6 kp./cm.². For this reason, the feed pipe 57 from a storage container (not shown) for the suspension is provided with a non-return valve 56, which closes when there is an over-pressure in the pressure chamber 61. This pressure chamber is also provided with e.g. a liquid-actuated suction and compression pump 52. The vertical dewatering chamber shown is similar to the one shown in FIGS. 1–3 and is connected to the upper end of the upwardly tapered pressure chamber 67 in the same way as the dewatering chamber 1 according to FIG. 1. The upper end of the pressure chamber 61 is preferably arranged somewhat below the liquid level in the storage container. The functioning of the device will be described in more detail hereinafter.

Figure 5:
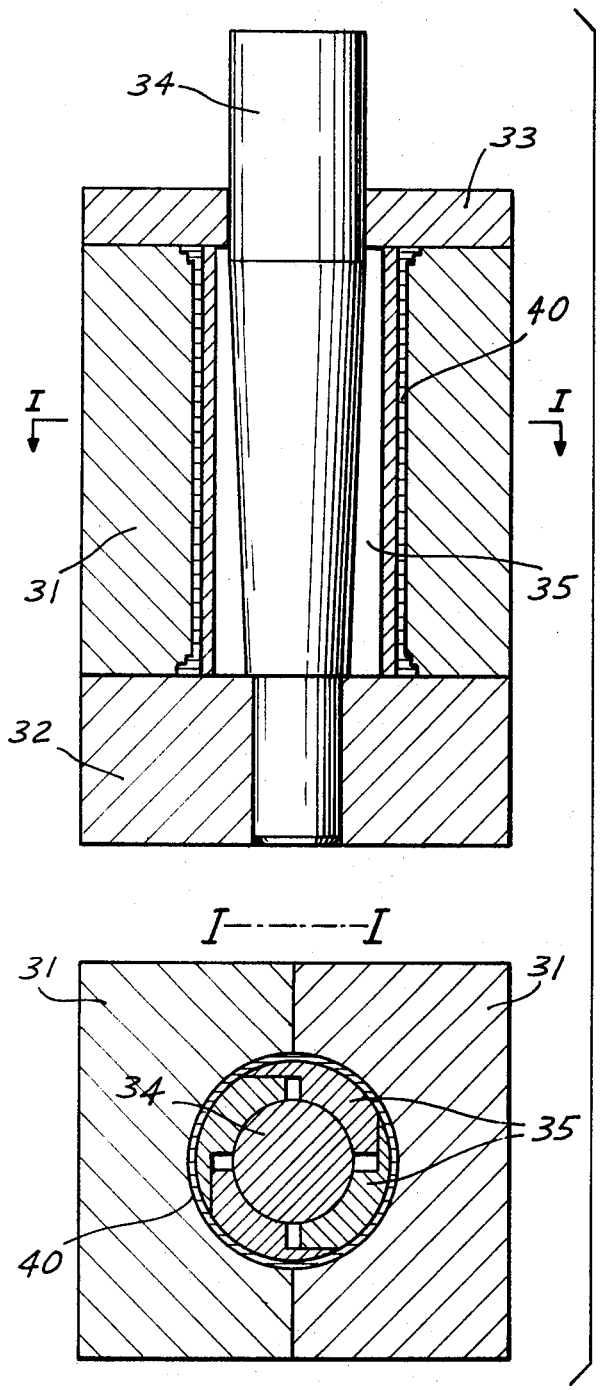

In FIG. 5 a section through a second dewatering station is shown. The station comprises an outer, divided mould 31 inserted between two guide plates 32 and 33, arranged at the ends thereof. The station also has a tapered mandrel 34 and a number of expander jaws 35. Dewatering channels or dewatering slots (not shown) are made in the mould sections and particularly also in the guide plates 32 and 33 and possibly also in the expander gear 34, 35. Further, the station is particularly provided with heating devices.

The device according to the invention can comprise one or several dewatering stations, even if the device herein described is only combined with a second one. Further, the device is shown with the first dewatering chamber directed upwards from the container, which, from the point of view of dewatering, is preferable, but said chamber can, of course, have any arbitrary position, as previously mentioned. In the following, the functioning of the device will be described in detail, and first with reference to FIGS. 1–3.

The homogeneous suspension is pressed by the pump 6 through the pipe 12 to the ring-formed chamber 7, where there will be a certain over-pressure. When the plunger 11 is in its lowered position, as shown in FIG. 2, the suspension will flow in through the slot between the upper end of the plunger and the non-return valve 20. The non-return valve 20 then assumes a raised position in relation to the plunger 11, owing to the friction between the valve and the outer tube 8 and because the rod or rods 19 permit a certain movement of the valve relative to the plunger 11.

During a feeding and compression movement of the plunger to the position shown in FIG. 3, the plunger brings along a certain volume of suspension into the space between the outer and the inner tubes. When the suspension is fed up into the dewatering chamber 21, i.e. the ring-formed space between the tubes, liquid will be pressed out through the slots in the outer tube 8 and also in the inner tube 9, in synchronism with the axial compression against the partly dewatered product 17 located above. Because of the particularly tapered form of one or both of the concentrical tubes 8, 9, whereby the dewatering chamber obtains a cross-section which tapers off upwards, the compression effect when the plunger makes the feeding movement is facilitated and the chamber can be made shorter. When a desired length of the now formed tubular member, dewatered to a dry content of at least 15%, particularly more than 30% has been obtained, it is cut off from the rest of the tubular member, either for use directly e.g. for insulation purposes or for transfer to and further dewatering in a second dewatering station. The cutting off and transfer to this second station can take place by means of some appropriate device. The dewatering in this second station, which is shown in FIG. 5, takes place through radial compression with the aid of a tapered mandrel 34, which coacts with tapered jaws 35 of some known kind, which mandrel 34 and which jaws 35 are inserted in the tube and compress the walls of the tube against an enclosing, divisible mould 31. The dewatering takes place through slots or holes through the walls of the mould sections, and can be facilitated by heating the tool to a temperature of 50–250° C. Because of the radial compression, whereby the thickness of the material is reduced to 40–50%, considerably improved strength properties of the tubular member are obtained, particularly as regards resistance towards internal pressure. The compression here mentioned, in the second dewatering station, can, of course, take place in two or more dewatering stations.

Figure 6:
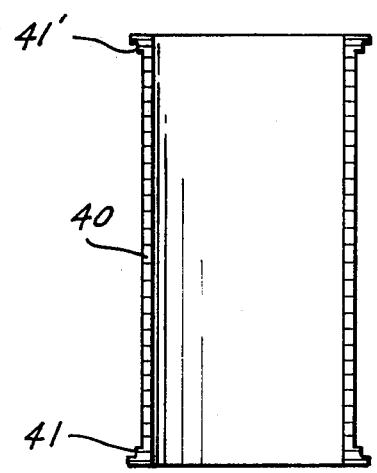
FIG. 6 shows a product made according to the invention.

In connection with the radial compression and dewatering the tubular member can be formed, when desired. The tubular member 40 can, for instance, as shown in FIGS. 5 and 6 be made with flanges 41, 41', for joining together with end parts to form a can.

The functioning of the device according to FIG. 4 is as follows. The suspension flows into the pressure chamber 61 through the non-return valve 56, until the liquid level in the lower part of the dewatering chamber is the same as the level in the storage container. At the starting position the suction and compression plunger 68 is at its innermost position as shown at A in the right-hand part of FIG. 4. At a compression movement of the plunger 51 into the dewatering chamber 67, the suspension is compressed and dewatered so that a formed member 40 with a dry content of at least 15% is formed. When the plunger 51 is in its uppermost position, as shown at A1 in the right-hand half of FIG. 4, the pressure chamber is completely sealed off. In this position of the plunger 51 the suction and compression plunger 68 is moved to its outermost position with the aid of some appropriate driving device, whereby a certain partial vacuum will occur in the pressure chamber 61 and liquid will flow into said chamber from the storage container via the pipe 57 and the non-return valve 56. The plunger 51 is thereafter moved by the driving device, for instance a hydraulic device 64, to its lowermost position, which is shown at B in the left-hand half of FIG. 4, and the passage into the dewatering chamber 67 is opened for the suspension in the pressure chamber. At the same time the suction and compression plunger 68 is moved to its innermost position, and the suspension is then pressed up into the dewatering chamber and reaches the draining openings in the concentrical tubes 58 and 59, and the dewatering procedure commences. When the suction and compression plunger 68 reaches its innermost position the compression plunger 51 is moved upwards, whereby the suspension is dewatered so that a formed member is obtained, after which the cycle is repeated, and for each stroke a formed member with a length of, for instance, 150 mm. is obtained. The compression can then be facilitated through dewatering chambers which taper off upwards, through counter pressure from the formed member made at the foregoing stroke, or through a specially arranged spring-action counterholder or through a combination of these. Thereafter cutting off, further dewatering and moulding can take place in the same way as described in the foregoing as regards the device according to FIGS. 1–3.

Even though only one procedure and two devices have been described, it should be obvious that also other procedures and devices can be applicable, provided that they fall within the scope of the concept of the invention. Thus, for instance, the device according to FIGS. 1–3 can work with a certain over-pressure in the suspension container and the device according to FIG. 4 can be provided with heating devices.

We claim:

1. The method of making tubular members of material comprising the steps of forming a slurry including a liquid and a lignocellulose material, reciprocatingly compressing said slurry in the axial direction within a vertically aligned dewatering chamber of annular cross-section with the compressive force being exerted in a direction opposite gravitational forces so that the liquid of the slurry is drained off without repassing through the tubular member formed, said tubular member having a dry content of at least 15%, and subjecting the wall of said tubular member to a radial compression reducing the thickness thereof to a selected percentage of the original thickness.

2. The method of claim 1 wherein the tubular member is built up by successive compressions with the tubular member in the dewatering chamber increasing in length for each compression.

3. The method of claim 1 characterized in that the slurry is fed to the dewatering chamber under pressure before the compression, the presure particularly being between 1-6 kp./cm.² over-pressure.

4. The method of claim 1 characterized in that the radial compression takes place at a pressure of from 10 to 100 atm.

5. The method of claim 1 wherein the radial compression step is performed in another dewatering chamber, said radial compression being such that the thickness of the tubular member is reduced to at least 40% of its original thickness.

6. The method of claim 1 characterized in that the radial compression takes place in combination with heating of sufficient temperature to thermoset the lignocellulose material.

7. The method of claim 6 characterized in that heating takes place to a temperature of 50–250° C.

8. The method of claim 1 characterized in that the slurry contains 1–6% dry content.

9. The method of claim 1 characterized in that the slurry consists of so-called Asplund Pulp in a water suspension.

10. The method of claim 9 characterized in that the Asplund Pulp is produced from unpeeled sawmill chips comprising 50% spruce and pine and 20% bark-free frame-sawdust.

11. The method of claim 1 characterized in that a bonding agent is added to the slurry.

12. The method of claim 11 wherein the radial compression is accompanied by heating of sufficient temperature to thermoset the bonding agent.

13. Apparatus for producing a tubular member from a slurry including water and lignocellulose material, said apparatus comprising a pair of vertically extending co-axial and radially spaced tubes, said tubes defining a cylindrical space therebetween and being provide with a plurality of fluid drain openings, a slurry reservoir communicating with the bottom of said coaxial tubes, a plunger reciprocatingly movable in the space between said coaxial tubes, said plunger being made for sealing coaction against the material between said coaxial tubes and a first non-return valve, at least one rod movable in said plunger and connected to said first non-return valve in such a way that at the return of said plunger after a compression stroke dewatered slurry is prevented from sliding down out of the space between said tubes, said first non-return valve being so dimensioned to permit passage of slurry at and during compression to provide sealing friction against the inner wall of the outer tube, said friction insuring a limited separation of said plunger and said first non-return valve during the return of said plunger from the compression stroke, and means for driving said plunger so that the lower excursion of its travel is below the bottom of said coaxial tubes whereby slurry is continuously forced upward between said tubes.

14. The apparatus of claim 13 characterized in that the lower end of said coaxial tubes are provided with a ring-shaped collection chamber enclosing an inlet opening for said plunger, said collection chamber being connected via a pipe emerging tangentially in said collection chamber to said slurry reservoir.

15. The apparatus of claim 13 further comprising a feeding chamber connected to the bottom of said coaxial tubes, and a second non-return valve connecting said slurry reservoir to said feeding chamber to prevent backflow of the slurry, a suction and pressure generating means communicating with said feeding chamber, said means being coupled to said plunger in such a way that when said plunger is in compression position the suction and pressure means sucks slurry into said feeding chamber via said second non-return valve and when said plunger is in its lower position produces a pressure in the slurry enclosed in said feeding chamber, said pressure forcing the slurry from said feeding chamber into the space between said coaxial tubes.

References Cited
UNITED STATES PATENTS

| | | | |
|---|---|---|---|
| 1,079,774 | 11/1913 | Lappen | 162—406 |
| 2,082,409 | 6/1937 | Manson | 162—379 |
| 3,021,254 | 2/1962 | Helversen et al. | 162—406 X |
| 3,236,722 | 2/1966 | Box | 162—222 |

S. LEON BASHORE, Primary Examiner

R. H. TUSHIN, Assistant Examiner

U.S. Cl. X.R.

16—293, 375, 406, 408